United States Patent
Brandstetter et al.

(10) Patent No.: US 8,354,195 B2
(45) Date of Patent: Jan. 15, 2013

(54) ELECTRIC STORAGE FUEL CELL SYSTEM AND METHOD

(76) Inventors: Aharon Brandstetter, Kfar-Vradim (IL); Haim Brandstetter, Bnei-Beraq (IL)

( * ) Notice: Subject to any disclaimer, the term of this patent is extended or adjusted under 35 U.S.C. 154(b) by 954 days.

(21) Appl. No.: 12/344,964

(22) Filed: Dec. 29, 2008

(65) Prior Publication Data

US 2010/0047633 A1 Feb. 25, 2010

(30) Foreign Application Priority Data

Jan. 2, 2008 (IL) .......................................... 188538

(51) Int. Cl.
*H01M 8/18* (2006.01)
(52) U.S. Cl. .......................................... 429/417; 429/49
(58) Field of Classification Search .................. 429/417, 429/49
See application file for complete search history.

(56) References Cited

U.S. PATENT DOCUMENTS 7,344,801 B2 * 3/2008 Cheng et al. .................. 429/101
2004/0121227 A1 6/2004 Cheng
2007/0029124 A1 * 2/2007 DasGupta et al. ........... 180/65.3

* cited by examiner

*Primary Examiner* — Keith Walker
*Assistant Examiner* — Caleb Henry

(57) ABSTRACT

The invention discloses an innovative fuel cell-type electrochemical energy conversion device and method of potentially high power density capability, suitable especially for stand-alone applications such as electricity-powered vehicles The inventive device, named "storage fuel cell", may be viewed as a converted storage battery, including plates, electrolyte and separators that can be similar to the ordinary known lead-acid battery. Thus it can be charged from an electrical source, or discharged across an external load with the usually high surge current features of storage batteries. An innovative additional charging mode of the storage fuel cell, by chemical reactions of each electrode with fuel and oxidizer supplied at specific flow ratios, is however the prime object of this invention.

Whereas all types of prior art fuel cells exchange ions between the electrodes, across the electrolyte, each of the electrodes of the instant fuel cell independently exchanges ions, only using their adjoining electrolyte.

13 Claims, 3 Drawing Sheets

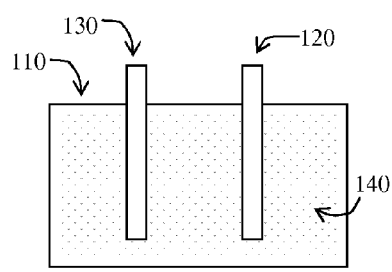
Fig. 1 – Prior art
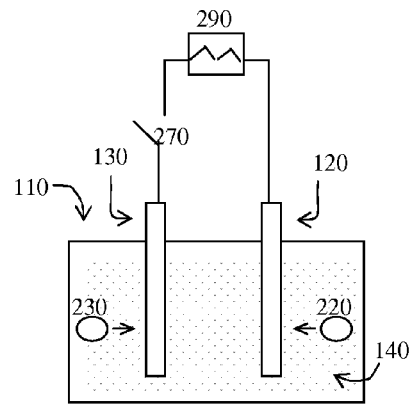
Fig. 2 – Prior art
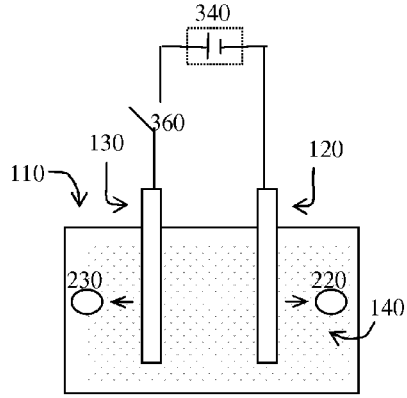
Fig. 3 – Prior art
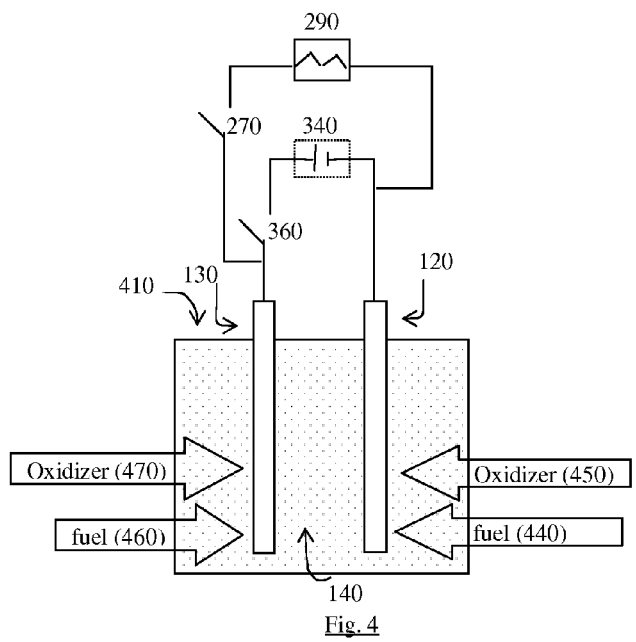
Fig. 4

ELECTRIC STORAGE FUEL CELL SYSTEM AND METHOD

FIELD OF THE INVENTION

The present invention relates generally to a storage cell system named storage battery, and to a fuel cell system. More particularly, the invention relates to a modified storage cell and to an innovative fuel cell.

BACKGROUND OF THE INVENTION

A prior art fuel cell is an electrochemical energy conversion device. Chemical energy stored in a fuel such as hydrogen is converted via an electrochemical reaction, with the participation of an oxidizer such as oxygen, into electrical energy of electrons flowing through an external electrical load. Operation proceeds as long as the flows of hydrogen and oxygen, and the electrolyte concentration, are maintained.

The basic concept of the prior art fuel cell is an electrochemical cycle based on a closed electrical circuit, consisting of ion transport from one electrode to the other inside the cell, together with electron flow from one electrode to the other outside the cell.

A typical reaction on the anode side is:

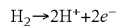

$$H_2 \rightarrow 2H^+ + 2e^-$$

The H+ ions travel through electrolyte towards the cathode, whilst the electrons, the desired product, travel in an external electrical circuit from the anode to the cathode.

On the cathode side oxygen reacts with the produced $2H^+ + 2e^-$, producing water:

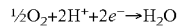

$$\tfrac{1}{2}O_2 + 2H^+ + 2e^- \rightarrow H_2O$$

The electric current flow with the complete electrochemical cycle is shown in these reactions by the anode producing two positive ions and two electrons, and the cathode receiving them.

The expressions show that the electrodes of the prior art fuel cell react mutually by transferring ions from one electrode to the other, while the electrodes remain unchanged in the cell.

In other fuel cell types the oxygen picks up electrons at the cathode and travels through the electrolyte to the anode, where it combines with hydrogen ions.

The ion transport requirement, together with electron flow blocking between the electrodes, is a challenge of prior art fuel cells. Thus fuel cells' most common classification is by the type of the electrolyte, such as Alkaline (AFC), Molten Carbonate (MCFC), Phosphoric Acid (PAFC), Proton Exchange Membrane (PEMFC), Solid Oxide (SOFC) and Direct-Methanol (DMFC).

Unlike prior art fuel cells, ion transport is neither a basic requirement nor a challenge for storage cells. The difference between traditional storage cells and prior art fuel cells is that each electrode of the storage cell independently reacts chemically with the adjoining electrolyte, rather than exchanging ions between the electrodes as in prior art fuel cells. While the electrodes of a storage cell react and chemically change as the storage cell is charged or discharged, the fuel cell's electrodes are chemically inert, apart from catalytic action.

A general fashion lead-acid storage battery is made of assembled plate groups, immersed in electrolyte in a sealed container, with + and − terminals. A plate consists of a rectangular structure of lead, alloyed with a little antimony to improve the mechanical characteristics. The plate is in fact a grid with rectangular holes in it, the lead forming thin walls to the holes. The holes are filled with a mixture paste of red lead ($Pb_3O_4$) and dilute sulfuric acid or other. The paste is pressed into the holes which are slightly tapered on two sides to assist in the retention of the paste. This paste remains porous and allows the acid to react with the lead inside the plate increasing the surface area many fold. The plates are then stacked together with suitable separators, the choice shifted from wood to rubber to glass mat to cellulose based separators to sintered PVC to microporous PVC/polyethylene separators, thereby fabricating a group of electrodes. Each set of alternate plates in a stack are connected together by a connecting conductor. At this stage the positive and negative plates are identical.

A cell refers to each stack of positive and negative plate pairs. The assembly of several cells in series to produce a higher voltage is called a battery. Lead-acid car batteries for a typical 12 volt system consist of six storage cells of 2.1 volt nominal voltage. Electrolyte is added to the battery, and the cell is then given its first forming electrical charge. The positive plates gradually turn to lead dioxide, and the negative turn to lead.

Storage batteries, such as of lead-acid type, are advantaged over prior art fuel cells for supplying high surge currents, despite low energy-to-weight ratio and a correspondingly low energy-to-volume ratio. This, along with their low cost, makes them indispensable for use in cars, as they aptly provide the high electric power required by automobile starter motors.

The prior art fuel cell types detailed above do not store electrical energy. To overcome their insufficient power output capability in some applications such as small stand-alone power plants or the so called "fuel cell battery hybrid" such as in vehicles, fuel cells are combined with electrical storage systems to form an electrical power source of sufficiently high power output capability.

U.S. Pat. No. 7,033,699 to OVSHINSKY discloses an approach to fuel cells comprising storage of energy. OVSHINSKY discloses fuel cell cathodes and instant startup fuel cells employing these cathodes. The cathodes operate through the valence change mechanism of redox couples which uniquely provide multiple degrees of freedom in selecting the operating voltages available for such fuel cells.

Such cathodes provide the fuel cells in which they are used, particularly alkaline fuel cells, with a level of chemical energy storage within the cathode itself. This means that such fuel cells will have a "buffer" or "reactant charge" available within the cathode at all times.

The cathode in accordance with the OVSHINSKY invention comprises a cathode active material including a valence change material. The valence change material provides the cathode with an oxygen storage capacity.

OVSHINSKY argues that in cathodes prior to his invention, no storage of reactant occurs. That is, oxygen travels directly through the active materials and reacts at the electrolyte interface. In the cathodes of the OVSHINSKY invention, oxygen is stored in the cathode via a change in valence state within the reversible redox couples, and is then available, at the electrolyte interface of the cathode.

A fuel cell that has the built in hydrogen and oxygen storage of the OVSHINSKY invention, has the advantage of being able to start producing energy instantly from the reactants stored in its electrodes. Thus, there is no lag time while waiting for hydrogen to be supplied from external sources. Additionally, because hydrogen and oxygen can be adsorbed and stored in the respective electrode materials of the fuel cell, energy recapture can be achieved as well. Therefore, according to OVSHINSKY, activities such as regenerative braking, e.g braking energy in electric cars, etc., can be performed without the need for a storage cell that is external to the fuel cell because any reactants produced by running the fuel cell in reverse will be stored in the electrodes of the fuel cell.

Therefore, in essence, fuel cells employing the OVSHINSKY active electrode materials would be the equivalent of a fuel cell combined with a storage cell.

However, OVSHINSKY teaches storage of hydrogen and oxygen, not of electricity as in a storage cell.

It would be desirable to provide a fuel cell in which the electrical energy is stored, similarly as it is in a storage cell; and it would be desirable to provide a storage cell, such as a lead-acid type, which is capable of being charged with electricity from an external supply of fuel and oxidizer.

SUMMARY OF THE INVENTION

The present invention discloses an innovative power source combining the characteristics of a storage cell and of a fuel cell. Therefore potentially it possesses both high power density of a storage cell and high energy density of a fuel cell.

In accordance with a preferred embodiment of the present invention, there is provided an electrical storage cell comprising a pair of electrodes, which are electrically charged by chemical reactions with hydrogen and oxygen, and are electrically discharged, supplying power, by electrical load.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings in which:

FIG. 1 is a schematic illustration of a prior art traditional lead-acid storage cell.

FIG. 2 is a schematic illustration of the prior art lead-acid storage cell of FIG. 1 in discharging process.

FIG. 3 is a schematic illustration of the prior art lead-acid storage cell of FIG. 1 in charging process.

FIG. 4 is a schematic illustration of the inventive electrochemical cell, named "storage fuel cell", connected to external electrical devices.

DETAILED DESCRIPTION OF THE PREFERRED EMBODIMENTS

Figure 5:
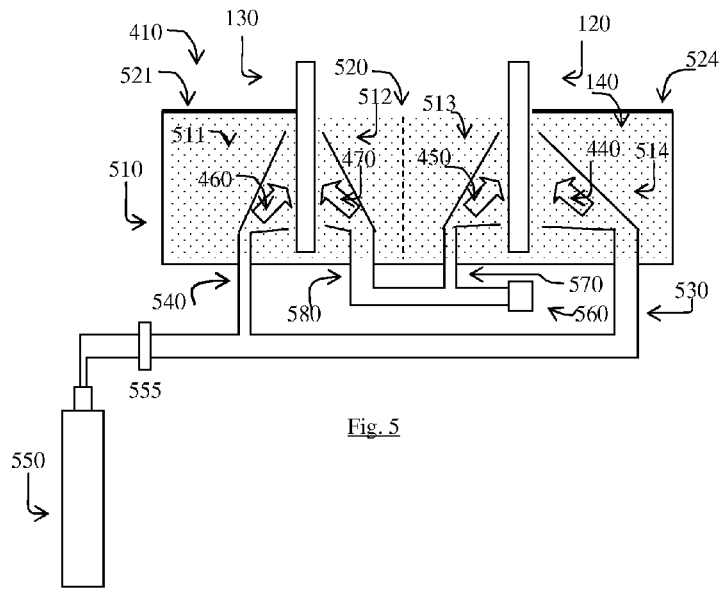
FIG. 5 is a schematic illustration of the structure of the inventive storage fuel cell 410, shown in FIG. 4 in a preferred embodiment of the present invention.

The present invention discloses an innovative system and method to provide electrical power of potentially high energy density along with high power density for stand-alone applications such as electricity-powered vehicles. It deduces from the storage cell a new concept of a fuel cell, by converting the storage cell into a new type of a fuel cell, named "storage fuel cell", which features built-in storage capacity for the electrical energy produced from fuel and oxidizer.

The innovative fuel cell in a preferred embodiment is a converted storage battery, including plates, electrolyte and separators that are similar to the ordinary known storage battery; thus it can be charged by electrical source or discharged across an external load, with the proven high surge current features of these batteries. A novelty in the invention is the added mode for charging this fuel cell by purely chemical reactions by each electrode via the electrolyte with fittingly supplied flows of fuel and oxidizer.

The following description and reaction expressions refer to the embodiment of an inventive storage fuel cell of lead-acid type, though similar descriptions may be applied to other types of these cells.

Referring to FIG. 1 there is shown a prior art traditional lead-acid storage cell 110. In the charged state this cell, and also the inventive cell, contains electrodes consisting of a mainly spongy lead metal (Pb) anode 120 (the negative electrode in a voltaic or galvanic cell) and a lead dioxide ($PbO_2$) cathode 130, in an electrolyte 140 of about 37% sulfuric acid ($H_2SO_4$) by weight in water. In this solution the $H_2SO_4$ is decomposed to $2H^+ + SO_4^{2-}$.hydrogen and sulfate ions.

Referring now to FIG. 2 there is shown a schematic illustration of the lead-acid storage cell of FIG. 1 in the discharging process. During discharge both electrodes 120 and 130 turn into lead sulfate ($PbSO_4$) and the specific gravity of the electrolyte 140 decreases to 1.15 gr/cc, compared to 1.25 gr/cc in the fully charged state. With a supply switch 270 closed, the storage cell 110 supplies electrical power to an external load 290.

The chemical reactions for discharging the storage cell 110 are as follows. At the anode 120 (Pb) there is the following oxidation reaction:

$$Pb + SO_4^{2-} \rightarrow PbSO_4 + 2e^- \quad \epsilon = 0.36 \text{ V} \qquad 1)$$

At the cathode 130 ($PbO_2$) there is the following reduction reaction:

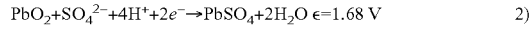

$$PbO_2 + SO_4^{2-} + 4H^+ + 2e^- \rightarrow PbSO_4 + 2H_2O \quad \epsilon = 1.68 \text{ V} \qquad 2)$$

where the voltages 0.36V and 1.68V, which provide most of the 2.1 volt nominal voltage mentioned above, are standard oxidation potentials of these reactions as appear in tables.

The $SO_4^{2-}$ ion of expression 1 is represented by blob 220, and the ions $SO_4^{2-} + 4H^+$ of expression 2 are represented by blob 230. The discharging process is effected in these reactions by the anode 120 producing two electrons via the reaction of expression 1 and transferring them through the external load 290 and (closed) switch 270 to the cathode 130; and cathode 130 receiving these electrons, via the reaction of expression 2.

The chemical reactions for discharging the inventive cell do not involve fuel or oxidizer, and they are the same as the prior art storage cell chemical reactions. However, the charging process of the inventive cell is very different from that of the storage cell 110, although a main concept of the chemical reactions for charging the inventive cell is deduced from the concept of the chemical reactions of the traditional storage cell 110.

Referring now to FIG. 3 there is shown a schematic illustration of the lead-acid storage cell of FIG. 1 in charging process. FIG. 3 describes the charging process of the traditional storage cell 110 in order to further demonstrate the inventive step of the present storage fuel cell. Closing of charging switch 360 connects an external electric power source 340 to the electrodes 120 and 130 to charge the storage cell 110, via the above mentioned reactions of expressions 1 and 2 but in opposite directions. The electric power source 340 supplies electrical energy to the storage cell 110, driving electrons to flow from the power source to the $PbSO_4$ anode 120 to reduce it back to Pb by the following chemical reaction, which is the inverse of expression 1

$$PbSO_4 + 2e^- \rightarrow Pb + SO_4^{2-} \quad (1')$$

and to receive electrons from the $PbSO_4$ cathode 130 to transform the cathode 130 back to $PbO_2$ by the following chemical reaction, which is the inverse of expression 2:

$$PbSO_4 + 2H_2O \rightarrow PbO_2 + SO_4^{2-} + 4H^+ + 2e^- \quad (2')$$

The $SO_4^{2-}$ ion represented by blob 220 produced at the anode 120 and the $SO_4^{2-} + 4H^+$ ions represented by blob 230, produced at the cathode 130, remain in solution in the electrolyte 140, ready for the next discharge. And, similarly, same amount of water $2H_2O$ which was produced during discharge is absorbed now during charge.

Referring now to FIG. 4 there is shown a schematic illustration of the inventive storage fuel cell connected to external devices. The inventive cell 410 includes the same anode 120, the cathode 130, and the electrolyte 140 of the prior art storage cell 110. Thus, the discharging of the storage fuel cell 410 proceeds according to the description of FIG. 2.

The charging of the storage fuel cell 410 can also proceed like the traditional storage cell, according to the description of FIG. 3. However the instant cell provides for an innovative additional mode of charging.

As in the prior art storage cell 110, the charging reaction at the anode 120 of the inventive cell 410 produces $SO_4^{2-}$ ions at the $PbSO_4$ anode 120 to reduce it to Pb. However, not like the prior art storage cell, where this reaction is driven by electrons originating from an extrinsic electric power source 340 to transfer electrons to the anode 120, the electrons in the inventive storage cell originate from fuel $H_2$ reacting with the electrodes via their catalysts as in a prior art hydrogen-oxygen fuel cell by $$H_2 \rightarrow 2e^- + 2H^+ \quad (3)$$

Not like the anode reaction of expression 1' of the prior art storage cell 110 that requires external energy, which is driven from the external power source 340, the $PbSO_4$ anode 120 of the instant cell 410 receives electrons from fuel 440, by $2H_2 \rightarrow 4e^- + 4H^+$ as given in expression 3, along with an additional supply of $\frac{1}{2}O_2$ oxidizer 450. The anode reaction can then proceed in a way (methodically) expressed by $$PbSO_4 + 4e^- + 4H^+ + \tfrac{1}{2}O_2 \rightarrow Pb + 2H^+ + SO_4^{2-} + OH^- + H^+ + 20.5 \text{ kcal/mol} \quad (4)$$

where the 20.5 kcal/mol is a summation of the known –194, 0, 0, 0, –177, and –37.5 kcal/mole free energies of $PbSO_4$, $H^+$, $O_2$, Pb, $SO_4^{2-}$, and $OH^-$ respectively.

With the further free energies –57 and –177 kcal/mole of $H_2O$ and $H_2SO_4$(aq) respectively, expression 4 is the stoichiometric equivalent of $$PbSO_4 + 2H_2 + \tfrac{1}{2}O_2 \rightarrow Pb + H_2SO_4 \text{(aq)} + H_2O + 40 \text{ kcal/mole} \quad (5)$$

The cathode reaction to reduce the $PbSO_4$ cathode 130 back to $PbO_2$, instead of the prior art storage cell charging reaction shown in expression 2' that requires external energy, which is driven from the external power source 340, can here proceed by the reaction of expression 6 below. Following additional fuel $H_2$ shown by 460 to produce another $H_2 \rightarrow 2e^- + 2H^+$ catalyst reaction of expression 3 at the anode 120, and additional $O_2$ shown by 470, with the –52 kcal/mole free energy of $PbO_2$ and the above-cited free energies, said cathode reaction can be expressed by $$PbSO_4 + 2H^+ + 2e^- + O_2 \rightarrow PbO_2 + H_2SO_4 \text{(aq)} + 35 \text{ kcal/mol} \quad (6)$$

Unlike storage cell reactions, the cathode reaction of expression 6 does not depend on the anode reaction of expression 5 (or 4) and vice versa, since each electrode produces its own $H^+$ ions, applying a separate reaction of expression 3.

The overall charging reaction, which describes expression 5 of the anode and 6 of the cathode, is the following:

$$2PbSO_4 + 2H_2 + \tfrac{1}{2}O_2 + H_2 + O_2 \rightarrow Pb + PbO_2 + 2H_2SO_4 \text{(aq)} + H_2O + 75 \text{ kcal/mol.} \quad (7)$$

The charging reactions of expression 7 restore the lead sulfate (2PbSO4) electrodes 120 and 130 back to lead (Pb) and lead dioxide ($PbO_2$) respectively, and regain sulfuric acid ($2H_2SO_4$(aq)) of electrolyte 140, lost during discharge, shown by blobs 220 ($SO_4^{2-}$ of expression 1) and 230 ($SO_4^{2-} + 4H^+$ of expression 2) of FIG. 2.

Since the instant cell charges using chemical energy to fuel exothermic reactions, this cell may not require heating from an external source.

The described embodiment of charging the instant cell uses 2 units of $H_2$ and $\frac{1}{2}$ a unit of $O_2$ for the reaction of the anode 120 according to expression 5 (or 4), plus 1 unit of $H_2$ and 1 unit of $O_2$ for the reaction of the cathode 130 according to expression 6.

The described embodiment produces 2 moles of water during discharge according to expression 2, plus 1 mole of water during charge, according to expression 7, per charge-discharge cycle per mole of anode lead. This means that 54 mille-liter water should be removed from the cell per 207 grams of its anode lead, for each complete charge-discharge cycle.

It can be summarized that a pair of electrodes 120 and 130 immersed in electrolyte 140 are electrically charged by chemical reactions with appropriate flows of fuel and oxidizer shown by 440, 450, 460 and 470 as described by expressions 5 (or 4) and 6, and are electrically discharged by chemical reactions driven by electrical current as described by expressions 1 and 2.

Electro-chemical corrosion during discharge due to polarization is similar to the prior-art battery; the innovative charging is not subject to polarization since it is purely chemical.

As in the prior art traditional storage cell 110, the inventive cell 410 may supply electricity to the external load 290 by closing switch 270. Like a traditional storage cell, the instant cell may be charged or discharged at various levels of current. Like a traditional storage cell, the instant cell 410 can also be charged by the external electric power source 340 through switch 360. The external electric power source 340 may be a regenerative brake, which converts kinetic energy into electrical energy.

Like a prior art fuel cell connected to a traditional storage cell 110, the instant cell 410 can also supply power to external load 290 simultaneously while being charged not only by the fuel and oxidizer supplies of 440, 450, 460 and 470, but also by the external power source 340 such as the regenerative braking, which switches the electric motor of a vehicle into a generator as the vehicle is braked or is moving downhill.

Referring now to FIG. 5 there is shown a schematic illustration of the structure of the inventive storage fuel cell 410, shown in FIG. 4 in a preferred embodiment of the present invention. The structure of the inventive cell 410 includes the anode 120 and the cathode 130 immersed in the electrolyte 140, contained in a container 510. The electrodes 120 and 130 are interspersed with fuel and oxidizer catalysts, such as platinum powder or other, as used in prior art fuel cells. The electrodes 120 and 130 are separated by general-fashion lead-acid storage battery separators 520.

A single hydrogen source 550, controlled by a faucet 555, supplies the hydrogen both to the anode 120 and to the cathode 130. Inlet pipe 530 of hydrogen to the anode 120 is wider, figuratively, than inlet pipe 540 to the cathode 130, such as to double the supply of hydrogen 440 to the anode 120 relative to the supply of hydrogen 460 to the cathode. Since the instant cell is capable of storing the produced electricity, the faucet 555 can be an On-Off fixed-amount faucet, determined by efficiency considerations of the cell 410 and other parameters.

A single oxygen source 560, supplies the oxygen both to the anode 120 and to the cathode 130. Inlet pipe 580 of oxygen to the cathode 130 is wider than inlet pipe 570 to the anode 120, such as to double the supply of oxygen 470 to the cathode 130 relative to the supply of oxygen 450 to the anode 120. The oxygen source 560 can be pump-driven atmospheric air.

In a preferred embodiment, the oxygen supply 470 and the hydrogen supply 460 are separated into separate sub-cells 512 and 511, respectively, at the opposite sides of the reacting electrode 130, as shown in FIG. 5. Similarly the oxygen supply 450 and the hydrogen supply 440 are separated into separate sub-cells 513 and 514, respectively, at the opposite sides of the reacting electrode 120. Since the oxygen is free of cost, the reactions can be tuned by the consumed hydrogen. Thus the sub-cells 511 and 514 of the hydrogen are closed by covers 521 and 524, such that all of the hydrogen will react, whereas the sub-cells of the inlets of the oxygen supplies 450 and 470 allow surpluses of oxygen to be released outside the cell.

Figure 6:
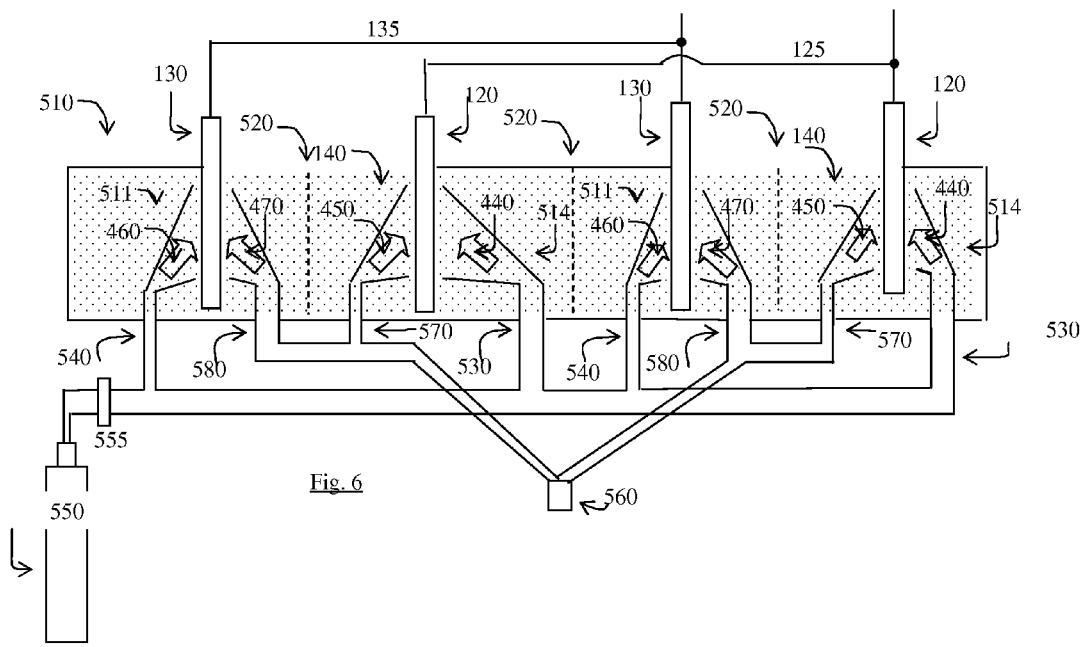
FIG. 6 is a schematic illustration of the structure of two inventive storage fuel cells shown in FIG. 5, configured in a battery fashion, in a preferred embodiment of the present invention.

The inventive cell may be configured in a battery fashion, similar to a general fashion lead acid storage battery, which is made of assembled plate groups into a container. Referring now to FIG. 6 there is shown a schematic illustration of the structure of two inventive storage fuel cells shown in FIG. 5, configured in a battery fashion, in a preferred embodiment of the present invention. Except for duplicating the components of FIG. 5, there are shown additional separators 520 separating here between hydrogen sub-cells 511 and 514. The anodes 120 are electrically interconnected by connection 125, and, separately, so are the cathodes 130 by connection 135.

Figure 7:
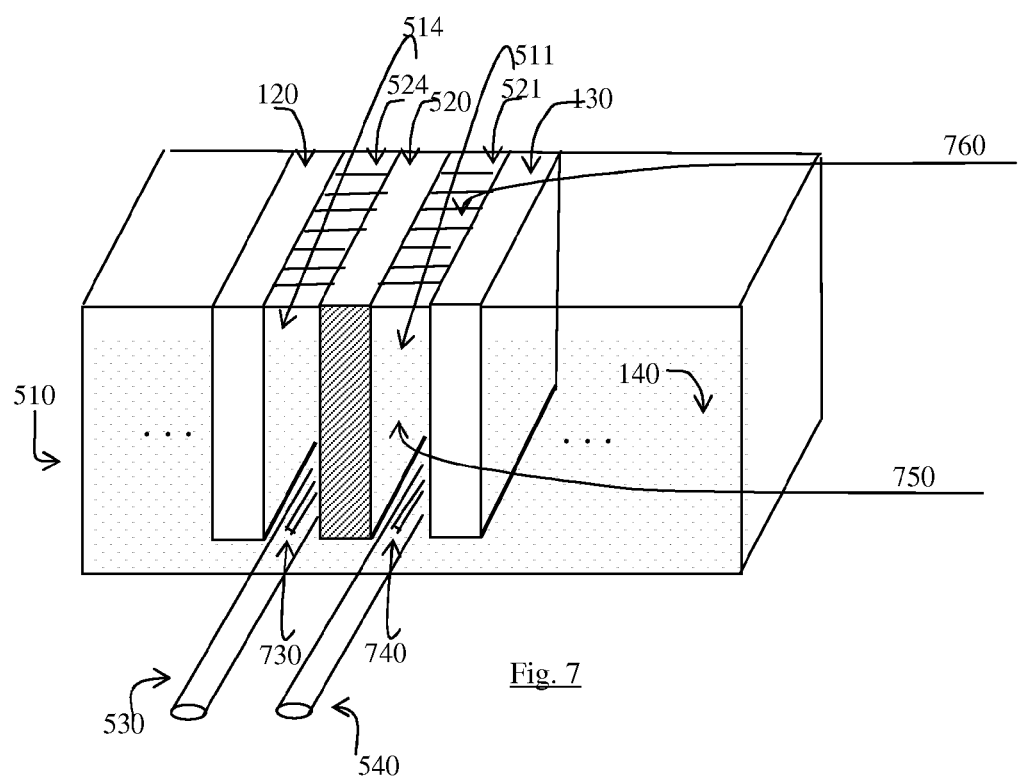
FIG. 7 is a three dimension schematic illustration of the adjacent hydrogen sub-cells 511 and 514 shown in FIG. 6 in a preferred embodiment of the present invention.

Referring now to FIG. 7 there is shown a three dimension schematic illustration of the adjacent hydrogen sub-cells 511 and 514 shown in FIG. 6 in a preferred embodiment of the present invention. The structure of electrode plate 120, electrode plate 130 and the separator 520, stacked together and immersed in shared electrolyte 140 in the container 510, is similar to the prior art storage cell. The adjacent hydrogen sub-cells 511 and 514 are pervious to the shared electrolyte 140, through the pores of the confining electrodes 130 and 120 respectively, also allowing the water produced in these sub-cells to be released through the open sub-cells 512 and 513 of the oxygen. However, each of sub-cells 511 and 514 forms a sealed space, to forbid direct reaction of the hydrogen with the oxygen, and to increase control over the amounts of supplied hydrogen. Sub-cell 514 is formed by the electrode plate 120 at the left, by the separator 520 at the right, by the cover 524 above, by the inlet pipe 530 beneath, and by front and rear closures of the stack that are parallel to the front wall 750 and the rear wall 760 of the container 510, all sealed with epoxy or sealant. In the same figurative manner sub-cell 511 is formed by the electrode plate 130 at the right, by the separator 520 at the left, by the cover 521 above, by the inlet pipe 540 beneath, and by the front and rear closures of the stack, all sealed with epoxy or sealant.

The fuel 440 is injected to the sub-cell 514 through a longitudinal fuel injection slot 730 on the inlet pipe 530. The fuel 460 is injected to the sub-cell 511 through a longitudinal fuel injection slot 740 on the inlet pipe 540.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. An electricity supply system, comprising:
    a contained electrolyte,
    a cathode-anode pair of electrodes immersed in said electrolyte, said cathode-anode pair of electrodes comprising lead sulfate in the discharged state, and
    fuel and oxidizer controlled supplies to said electrodes,
    wherein said electrodes undergo chemical reactions with said fuel and oxidizer when supplied, converting the chemical energy stored in said fuel into an electrical energy charge stored within said chemically reacted electrodes.

2. The system of claim 1 wherein each of said electrodes is independent to react with separate flows of said supplied fuel and oxidizer.

3. The system of claim 1 wherein said pair of electrodes comprises two separated places, substantially similar in the discharged state, configured in a cell of a storage battery fashion.

4. The system of claim 3 wherein
    said plates consist of storage-battery lead sulfate in the discharged state, interspersed with fuel and oxidizer catalyst,
    said electrolyte consisting of diluted sulfuric acid,
    said flows to said anode substantially consist of two moles of hydrogen and half a mole of oxygen for reducing one mole of said lead sulfate to lead, and
    said flows to said cathode substantially consist of one mole of hydrogen and one mole of oxygen for oxidizing one mole of said lead sulfate to lead dioxide.

5. A method for supplying electricity comprising the steps of
    immersing a cathode-anode pair of electrodes in electrolyte, said cathode-anode pair of electrodes comprising lead sulfate in the discharged state,
    supplying controlled fuel and oxidizer to said electrodes, and chemically reacting said electrodes with said fuel and oxidizer when supplied, for producing electrical energy stored retrievably in said chemical reacted electrodes.

6. The method of claim 5 further comprising chemically reacting said charged electrodes with said electrolyte, supplying electrical energy by discharging said electrodes when connected to external electrical load.

7. The method of claim 5 wherein said chemical reactions of said electrodes with said fuel while charging, produce additional electrolyte, consumed by said chemical reactions of claim 11 while discharging.

8. The method of claim 6 wherein said charging can be separate from or simultaneous with said discharging.

9. The method of claim 5 wherein each of said electrodes is independent to react with separate flows of said supplied fuel and oxidizer.

10. The method of claim 5 wherein said pair of electrodes comprises two separated plates, substantially similar in the discharged state, configured in a cell of a battery fashion.

11. The method of claim 10 wherein said plates consist of storage-battery lead sulfate in the discharged state, interspersed with fuel and oxidizer catalyst, said electrolyte consisting of said storage-battery diluted sulfuric acid, said flows to said anode substantially consist of two moles of hydrogen and half a mole of oxygen for reducing one mole of said lead sulfate to lead, said flows to said cathode substantially consist of one mole of hydrogen and one mole of oxygen for oxidizing one mole of said lead sulfate to lead dioxide.

12. The method of claim 5 wherein said method further comprises connecting an electric cower source to said electrodes for charging said electrodes.

13. The method of claim 12 wherein said electric power source comprises a regenerative brake.

\* \* \* \* \*